(12) United States Patent
Tarahomi

(10) Patent No.: US 6,299,244 B1
(45) Date of Patent: Oct. 9, 2001

(54) LIGHTWEIGHT VEHICLE BODY PANELS AND METHOD OF BLOW MOLDING VEHICLE BODY PANELS

(75) Inventor: Sassan Tarahomi, Brighton, MI (US)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 09/633,989

(22) Filed: Aug. 8, 2000

(51) Int. Cl.$^7$ .................................................. B60J 7/00
(52) U.S. Cl. ........................ 296/210; 296/901; 296/191
(58) Field of Search ............................ 296/210, 191, 296/196, 197, 901, 100.02, 100.06

(56) References Cited

U.S. PATENT DOCUMENTS

| | | | |
|---|---|---|---|
| 2,763,586 | * 9/1956 | Noyes | 296/210 X |
| 2,987,345 | * 6/1961 | Grisinger et al. | 296/210 X |
| 4,425,001 | * 1/1984 | Mauri | 296/210 X |
| 5,059,056 | * 10/1991 | Banthia et al. | 296/29 X |
| 6,168,231 | * 1/2001 | Fielding et al. | 296/210 |

FOREIGN PATENT DOCUMENTS

| | | | |
|---|---|---|---|
| 0 178 858-A2 | * 4/1986 | (EP) | 296/210 |
| 2 576 862-A1 | * 8/1986 | (FR) | 296/210 |
| 286664 | * 6/1928 | (GB) | 296/210 |
| 763774 | * 12/1956 | (GB) | 296/191 |
| 790253 | * 2/1958 | (GB) | 296/901 |
| 5-104963-A | * 4/1993 | (JP) | 296/191 |
| WO-91/04899-A1 | * 4/1991 | (WO) | 296/210 |

* cited by examiner

*Primary Examiner*—Stephen T. Gordon
*Assistant Examiner*—Patricia Engle
(74) *Attorney, Agent, or Firm*—Brooks & Kushman P.C.

(57) ABSTRACT

A vehicle body panel that is formed in part by a blow molding process. Attachments may be assembled to openings formed by cutting off part of a blow molded body. Alternatively, attachments such as seals or seal retainers may be secured to peripheral portions of the blow molded body. The method of making a vehicle body panel includes blow molding all or a substantial portion of the vehicle body panel and then securing attachments to openings formed on the blow molded body or to peripheral portions of the blow molded body.

6 Claims, 3 Drawing Sheets

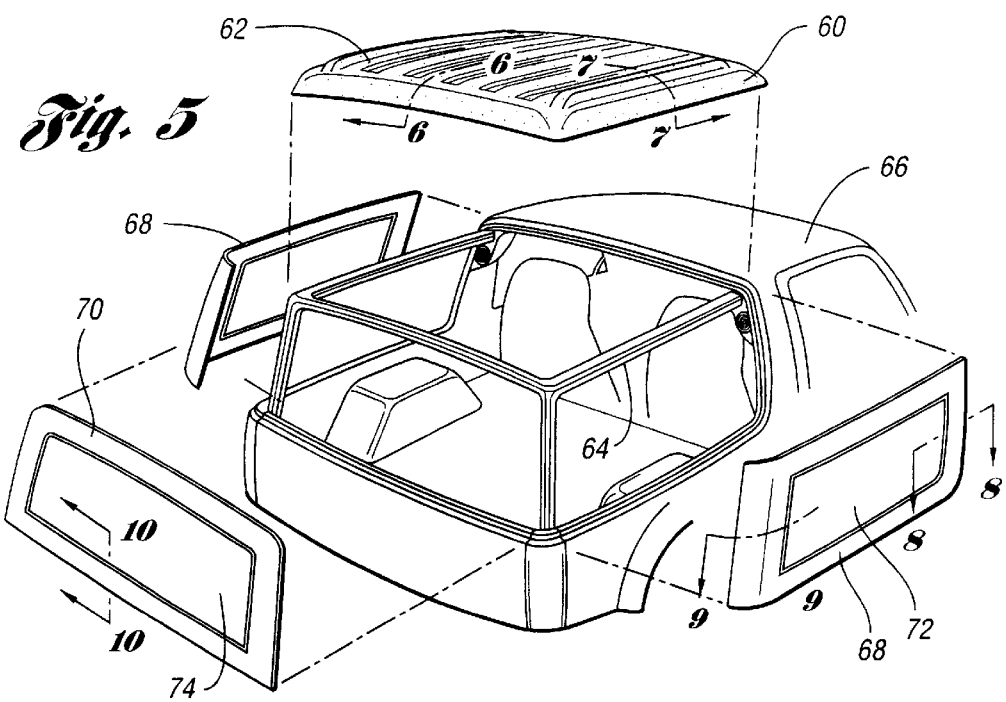
Fig. 5
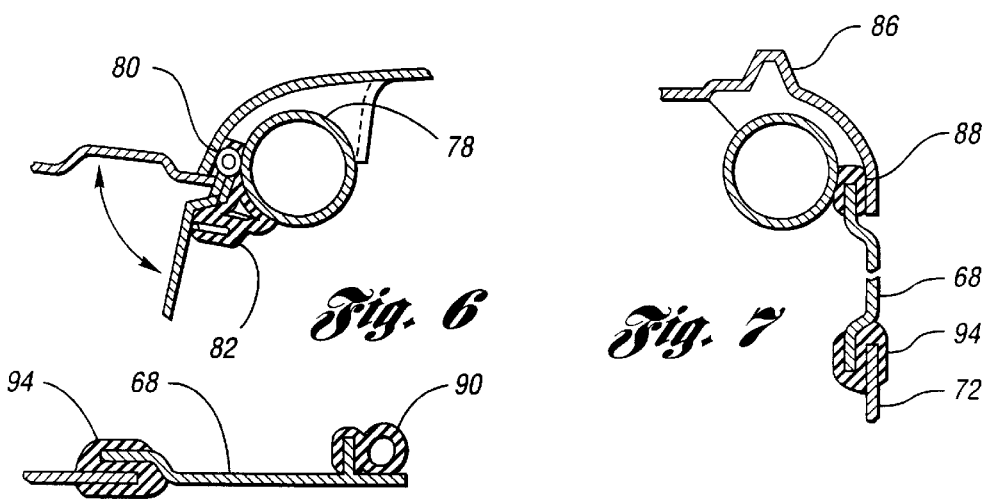
Fig. 6
Fig. 7
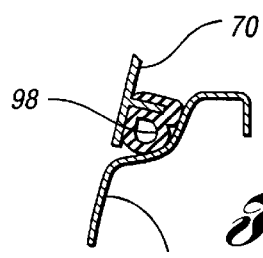
Fig. 8
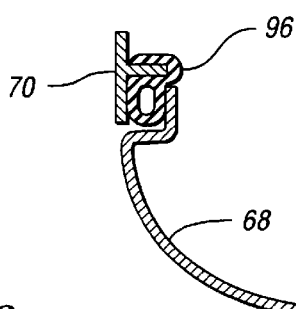
Fig. 9
Fig. 10

LIGHTWEIGHT VEHICLE BODY PANELS AND METHOD OF BLOW MOLDING VEHICLE BODY PANELS

TECHNICAL FIELD

The present invention relates to blow molded vehicle body panels and a method of making vehicle body panels by blow molding.

BACKGROUND ART

Conventional vehicle body panels are formed by an outer steel panel and an inner steel panel that are welded together. For example, an inner roof panel may include integrally formed reinforcing sections or reinforcements may be welded to the inner roof panel to provide added strength in particular locations. Steel roofs are strong but relatively heavy and manufacturing processes involved are labor-intensive.

Recently, injection molded vehicle body panels have been developed. For example, an outer roof panel and an inner roof panel may be separately injection molded and then bonded together in a secondary operation. Fasteners may also be used to supplement bonding the inner and outer roof panels together. This process is slow and labor-intensive, requiring many steps to form the roof and then assemble the roof panels together. In particular, the inner roof panel must be designed with reinforcing ribs and gusset walls to provide strength. One problem associated with injection molding an outer roof panel is that surface imperfections caused by shrink marks are created in the injection molding die. An inherent problem for large, relatively thin injection molded panels that are used for vehicle applications is the tendency of the panels to distort or vibrate when air flow and air pressure differentials are applied to the moving vehicle.

Rotational casting is a plastic processing technique that has been proposed for high strength applications. However, rotational casting of plastics results in a relatively heavy finished product that is expensive and may not always meet close tolerance requirements.

Blow molding is a efficient and economical plastic processing technique that is most commonly associated with forming PET beverage containers. One problem associated with blow molding is that it is difficult to maintain close tolerances. While it is possible to form sharp edges and corners by blow molding, it is difficult to consistently form these design elements. Another problem with blow molding techniques is the difficulty in maintaining consistent wall thickness in larger parts.

These problems encountered by prior art vehicle body panel designs and available plastic processing techniques are addressed by the present invention as summarized below.

DISCLOSURE OF INVENTION

It is a principal object of the invention to make a body panel that has a blow molded portion that makes up the majority of the body panel. Injection molded end caps and edge interfaces are secured at predetermined locations where close tolerances must be held. This approach provides an economical, strong body panel that is lower in cost and lighter in weight than multi-panel steel or injection molded body panels.

The present invention relates to providing a body panel for a vehicle that comprises a blow molded body panel having single wall portions and double wall portions. Attachments are secured to the edges of the blow molded panel wherein the attachment pieces have close tolerance elements or seals that are fit to other parts of the vehicle.

In one embodiment of the invention, a roof panel comprising a substantially horizontal roof section that is blow molded with a plurality of pillar extensions that extend generally downwardly from the horizontal roof section. The pillar extensions are initially formed by blow molding and have closed ends that are subsequently cut off to provide open ends. A plurality of separately formed end inserts are assembled to the open ends. The end inserts may be injection molded or metal parts.

According to another aspect of the invention, the roof panel comprises a substantially horizontal roof section that is completely blow molded with at least one closed edge that is cut off, leaving an edge opening. At least one separately formed edge insert is assembled to the edge opening.

According to the method of making a body panel for a vehicle of the present invention, a blow molding parison is formed and loaded into a blow molding die. Air is injected into the parison to expand the parison, filling the die and forming a blow molded body having integrally formed reinforcements. The blow molded body is cooled in the die and then removed. The end portions of the blow molded body are then partially cut off to form receptacles in which interface parts are inserted.

According to another aspect of the invention, as applied to making a roof assembly, the end portions of the blow molded body are adapted by the interface parts to mount to A, B and C pillars of the vehicle. The blow molded body has double wall portions and single wall portions that are arranged to provide localized areas of increased structural strength. The double wall portions may be located to provide wiring ducts or accessory mounting locations.

According to yet another aspect of the invention, the method may include the step of assembling a seal retainer on the blow molded body in a location where a seal is to be attached to the body panel. Alternatively, the method may include the step of assembling a window or door frame element to an edge of the blow molded body.

The method of the present invention may comprise forming a vehicle body panel by an injection molding process and then subsequently assembling trim pieces to the blow molded body formed in the blow molding process. One or more side edge portions of the blow molded body may be cut off to form a blow molded body having one or more openings into which a separately formed side edge insert may be assembled. Two side edge portions may be formed and adapted to receive two side edge portions. The side edge portions can be either the right and left sides or the front and rear edges of the blow molded body making up the body panel. Alternatively, four side edge portions can be cut off from the blow molded body to allow for the insertion of four side edge inserts on all four sides of the body panel assembly.

According to a further aspect of the invention, the trim pieces applied to the blow molded body may be seals that are secured to the periphery of the blow molded body. The seals may form an interface with adjacent components. The adjacent components may be frame members of the vehicle or side and rear panels forming a part of the passenger compartment and storage compartment enclosure.

These and other objects and advantages of the present invention will be more fully understood in view of the attached drawings and detailed description of the invention below.

BRIEF DESCRIPTION OF DRAWINGS

FIG. 5 is a fragmentary, exploded, perspective view of a vehicle having an alternative embodiment of a blow molded vehicle roof and blow molded side and rear panels shown in conjunction with a portion of a sport utility vehicle;

FIG. 6 is a cross-sectional view taken along the line 6—6 in FIG. 5;

FIG. 7 is a cross-sectional view taken along the line 7—7 in FIG. 5;

FIG. 8 is a cross-sectional view taken along the line 8—8 in FIG. 5;

FIG. 9 is a cross-sectional view taken along the line 9—9 in FIG. 5

FIG. 10 is a cross-sectional view taken along the line 10—10 in FIG. 5; and

BEST MODE FOR CARRYING OUT THE INVENTION

Figure 1:
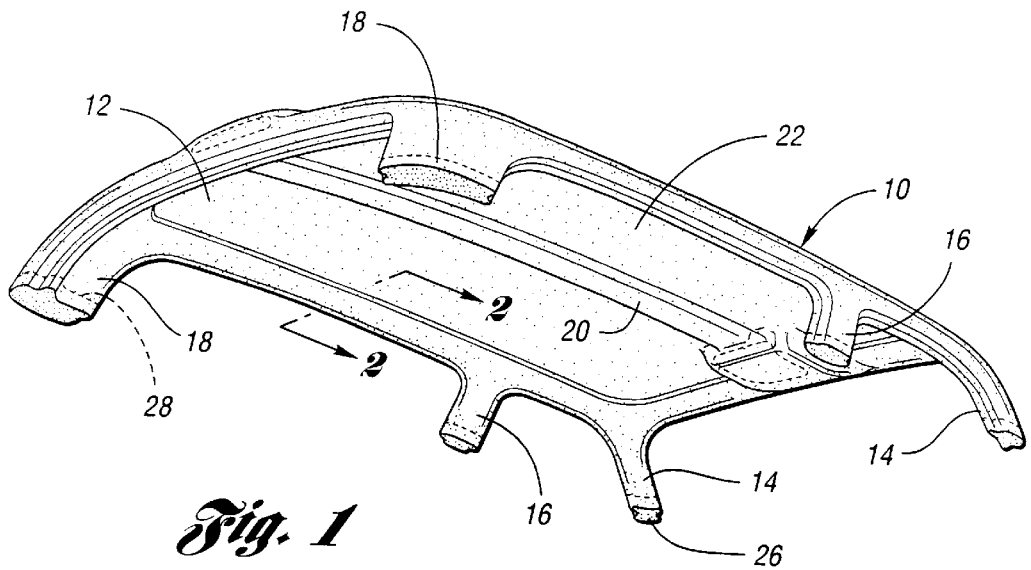
FIG. 1 is a perspective view of a vehicle roof made in accordance with the present invention.

Referring now to FIG. 1, one embodiment of a blow molded body 10 used to manufacture a vehicle roof is shown. The blow molded body 10 includes a roof panel 12 that spans the passenger compartment of the vehicle and a pair of A-pillar extensions 14, a pair of B-pillar extensions 16, and a pair of C-pillar extensions 18.

Figure 2:
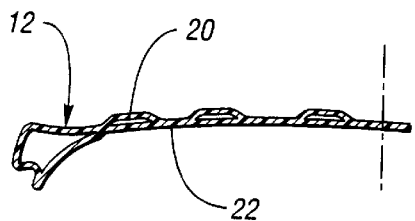
FIG. 2 is a cross-sectional view taken along the line 2—2 of FIG. 1.

Referring to FIGS. 1 and 2, the roof panel 12 includes double wall sections 20 and single wall sections 22 that form a self-reinforcing roof panel to minimize vibration and provide structural strength in the roof panel 12.

Figure 3:
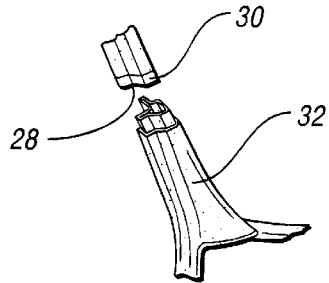
FIG. 3 is a fragmentary perspective view of a pillar extension of a vehicle roof made in accordance with the present invention and a vehicle pillar adapted to receive the vehicle roof of the present invention.

Referring now to FIGS. 1 and 3, the pillar extensions 14, 16, 18 are initially formed by blow molding and have closed ends 26. The closed ends 26 are cut off to provide open ends 28 in which inserts 30 are assembled. The inserts 30 are adapted to be assembled to one of the pillars. As shown in FIG. 3, insert 30 is ready to be assembled to the A-pillar 32 of a vehicle. The inserts 30 may be formed by injection molding to allow close tolerances to be met that would not ordinarily be possible in a blow molded structure. With blow molded structures, tolerances of 5–10% can be met, while injection molded parts may be molded to a 1–2% tolerance. The end caps may also be molded to integrate latches, flanges, and brackets that may be required to secure the roof to vehicle body pillars. The blow molded body 10 may be left with hollow sections in the double wall sections 20 or, if additional strength is required, the double wall sections 20 and the pillar extensions 14, 16 and 18 may be filled with a structural foam such as polystyrene, polyethylene, polypropylene, or polyurethane foam.

Figure 4:
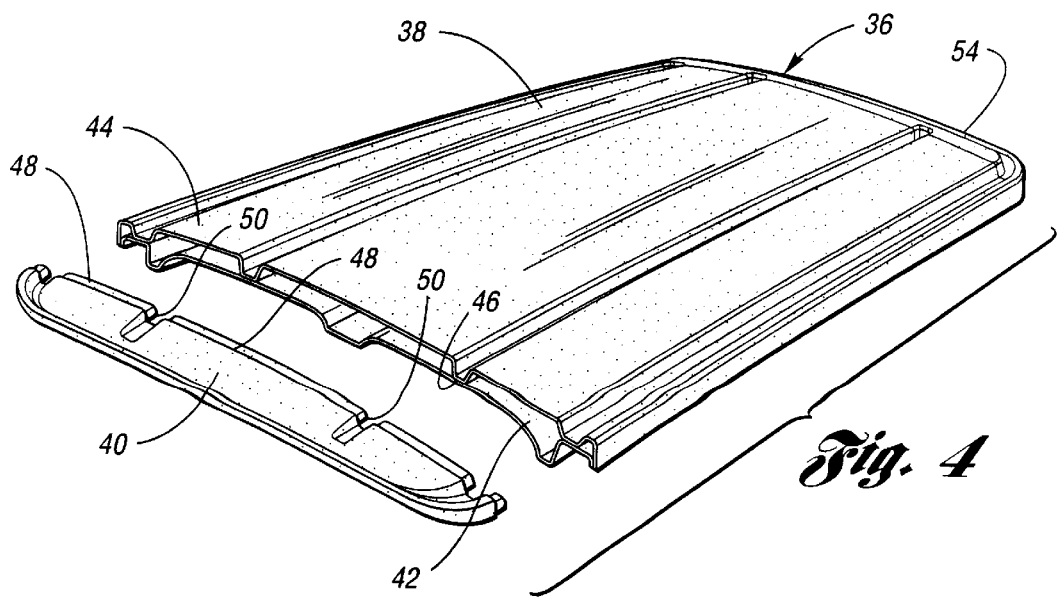
FIG. 4 is an exploded perspective view of a roof panel made in accordance with an alternative embodiment of the present invention.
Figure 11:
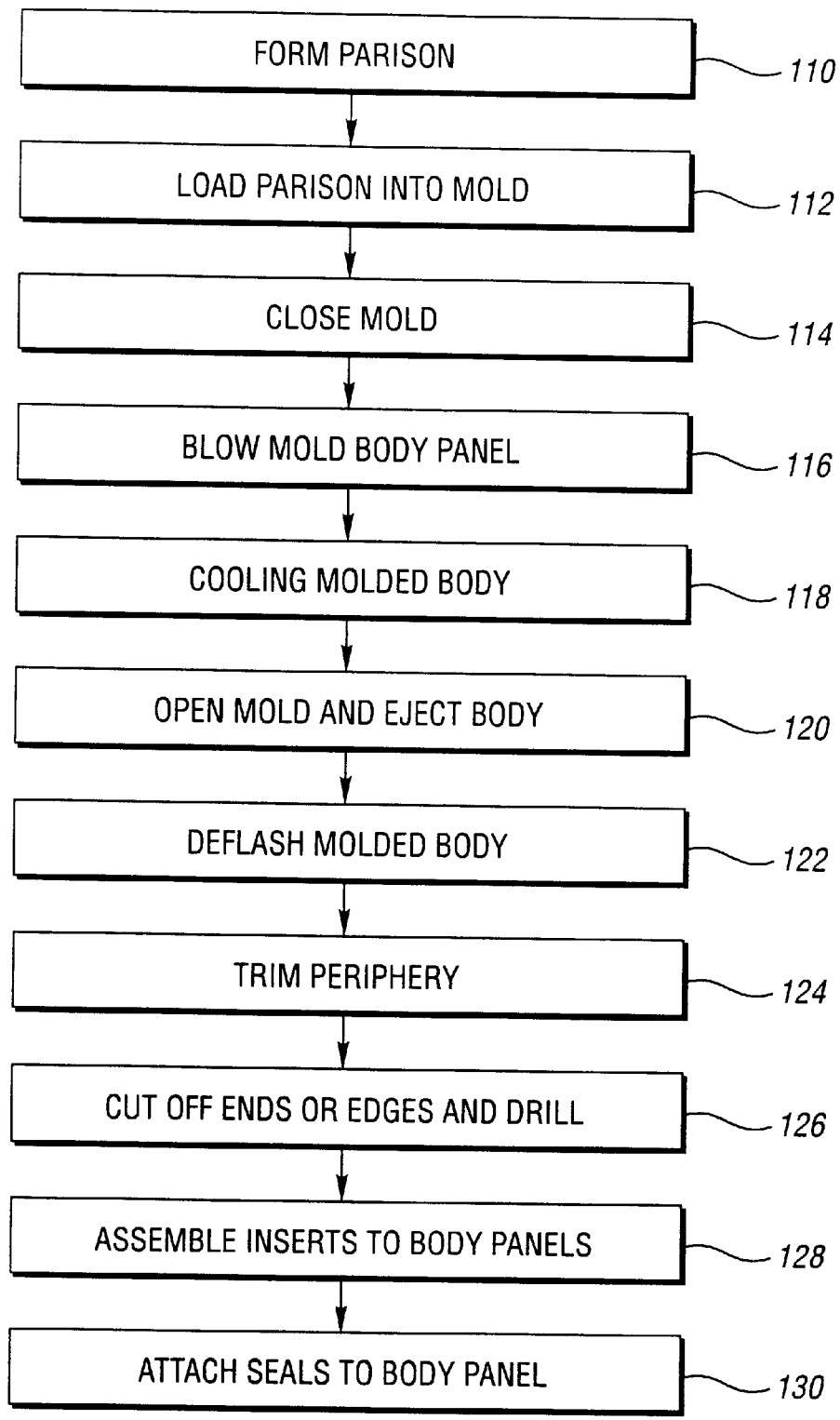
FIG. 11 is a flow chart illustrating the steps of the method of blow molding vehicle body panels.

Referring now to FIG. 4, an alternative embodiment of the invention is shown wherein a blow molded body 36 is initially formed. The blow molded body 36 includes a roof panel section 38 that spans and covers all or a substantial part of a vehicle passenger compartment. As shown in FIG. 4, one edge of the blow molded body 36 has been cut off to permit assembly of an edge cap 40 into the edge opening 42. It will be readily appreciated by one of ordinary skill in the art that one to four edge caps 40 could be provided on the edges of the blow molded body 36. The roof panel 38 has double wall sections 44 and single wall sections 46 that form a corrugated structure reinforcing the roof panel 38. The double wall section 44 is formed by two walls that are separated by a space. The single wall section 46 is formed by two walls that are not separated by a space and form what is referred to as a single wall. The edge cap 40 has protrusions 48 that are received in the double wall sections 44 of the roof panel and spaces 50 that are assembled to the single wall sections 46 of the roof panel 38.

As shown in FIG. 4, an uncut end 54 is provided opposite the edge cap 40. The uncut end 54 could be cut away and replaced by an edge cap 40 if required to meet close tolerances on both sides of the roof panel 38. The panel shown in FIG. 4 could be used to provide a close tolerance fit to the windshield header by means of the edge cap 40, while the sides and rear portion of the roof panel 38 could be left as blow molded edges if it is not necessary to meet close tolerances on the other three sides of the roof panel 38.

Referring now to FIG. 5, another alternative embodiment of the present invention is shown wherein a roof panel 60 is completely formed by a blow molding operation. The roof panel 60 includes longitudinal ribs 62 that are preferably single wall sections separating alternating double wall sections of the roof panel. The roof panel 60 is adapted to be secured to a tubular frame 64 that forms part of a vehicle 66 which, as illustrated, is a sport utility vehicle.

Side panels 68 and rear panel 70 also form part of the enclosure for the vehicle 66 and may be made according to the present invention as blow molded parts. Alternatively, such panels could be formed of other materials such as plastic composites, injection molded thermoplastics, or steel. Side windows 72 are provided in the side panels 68 and a rear window 74 is provided in the rear panel 70. The present invention can also be applied to manufacture doors, decklids, fenders, quarter panels, spoilers, hoods, or tailgates.

Referring now to FIG. 6, a concave lower edge surface 78 is provided on the roof panel 60. A hinge 80 connects the rear panel 70 to the roof panel 60 and a rear edge seal 82 is provided on the roof panel 60 adjacent the hinge 80. The rear edge seal 82 is preferably secured to either the roof panel 60 or the rear panel 70.

Referring now to FIG. 7, interconnection to the roof panel 60 to the side panel 68 and frame 64 is shown in detail. The roof panel 60 includes an integrally formed drip rail 86. A side edge seal 88 seals between the side panels 68 and the roof panel 60 and is preferably connected to the roof panel 60, but could also be attached to the side panel 68.

Referring now to FIG. 8, the side panel 68 and vehicle juncture is shown to include a side panel seal 90 and a side window seal 94. The side window seal 94 is also shown in FIG. 7.

Referring now to FIG. 9, the relationship of the side panel 68 and the rear panel 70 is shown to include the side window seal 94 and a side panel/rear panel seal 96.

Referring now to FIG. 10, the rear panel 70 is shown to include a bottom rear panel seal 98 that forms a seal between the rear panel 70 and the tailgate 100.

The method of the present invention may be modified by deleting, combining or reordering the steps described above. While the method is applicable to vehicle roofs, other body panels can be made according to the method of the present invention.

The method of present invention may be modified by deleting, combining or reordering the steps described above.

While the method is applicable to vehicle roofs, other body panels can be made according to the method of the present invention.

While the best mode for carrying out the invention has been described in detail, those familiar with the art to which this invention relates will recognize various alternative designs and embodiments for practicing the invention as defined by the following claims.

What is claimed is:

1. A roof and a vehicle in combination, the vehicle having a plurality of pillars that support the roof, comprising:

a blow molded roof panel having single wall portions and double wall portions, the double wall portions defining a space, and the single wall portions being formed without a space, the roof panel being formed to a first tolerance level;

attachment pieces being partially received in the space between the two walls of some of the double wall portions, the attachment pieces being secured to a peripheral portion of the blow molded panel, the attachment pieces being formed to a second closer tolerance level than the first tolerance level to facilitate assembly of the roof to the pillars of the vehicle.

2. The roof for a vehicle of claim 1 wherein the roof panel further comprises a substantially horizontal roof section that is completely blow molded and a plurality of pillar extensions that extend generally downwardly from the horizontal roof section.

3. The roof for a vehicle of claim 2 wherein the pillar extensions are formed initially by blow molding the pillar extensions with closed ends that are then cut off leaving a plurality of open ends, and a plurality of separately formed end inserts are assembled to the open ends.

4. The roof for a vehicle of claim 3 wherein the end inserts are injection molded parts.

5. The roof for a vehicle of claim 1 wherein the roof panel further comprises a substantially horizontal roof section that is completely blow molded with at least one closed edge that is then cut off leaving an edge opening, and at least one separately formed edge insert is assembled to the edge opening.

6. The roof for a vehicle of claim 1 wherein the attachment pieces are seals that are attached to an inner surface of a peripheral flange of the blow molded roof panel.

* * * * *